(12) United States Patent
Berggren et al.

(10) Patent No.: US 9,254,424 B2
(45) Date of Patent: Feb. 9, 2016

(54) SPORT BALL WITH INDENTED CASING

(71) Applicant: Nike, Inc., Beaverton, OR (US)

(72) Inventors: Scott R. Berggren, Portland, OR (US);
Tal Cohen, Larchmont, NY (US);
Vincent F. White, Beaverton, OR (US);
Gary W. Glahn, Rhoddodendron, OR (US)

(73) Assignee: NIKE INC., Beaverton, OR (US)

( * ) Notice: Subject to any disclaimer, the term of this patent is extended or adjusted under 35 U.S.C. 154(b) by 151 days.

(21) Appl. No.: 14/088,850

(22) Filed: Nov. 25, 2013

(65) Prior Publication Data

US 2014/0155203 A1 Jun. 5, 2014

Related U.S. Application Data (62) Division of application No. 12/959,886, filed on Dec. 3, 2010, now Pat. No. 8,617,011.

(51) Int. Cl.
| | |
|---|---|
| A63B 41/08 | (2006.01) |
| A63B 45/00 | (2006.01) |
| A63B 41/10 | (2006.01) |

(52) U.S. Cl.
CPC .............. *A63B 41/08* (2013.01); *A63B 41/10* (2013.01); *A63B 45/00* (2013.01); *A63B 2243/0025* (2013.01)

(58) Field of Classification Search
CPC ........ A63B 41/08; A63B 45/00; A63B 41/10; A63B 2243/0025
See application file for complete search history.

(56) References Cited

U.S. PATENT DOCUMENTS

| | | | |
|---|---|---|---|
| 414,748 | A | 11/1889 | Bentley |
| 1,517,859 | A | 12/1924 | O'Shea |
| 1,575,281 | A | 3/1926 | Rosenberg |
| 1,917,535 | A | 7/1933 | Maynard |
| 1,923,236 | A * | 8/1933 | Sonnett ..................... 473/599 |
| 1,931,429 | A | 10/1933 | Buckner et al. |
| 1,932,226 | A | 10/1933 | Pierce |
| 1,967,908 | A | 7/1934 | Sneary |
| 2,012,376 | A | 8/1935 | Caro |

(Continued)

FOREIGN PATENT DOCUMENTS

| | | |
|---|---|---|
| CN | 1241144 A | 1/2000 |
| CN | 1787857 A | 6/2006 |

(Continued)

OTHER PUBLICATIONS

International Search Report and Written Opinion in PCT Application No. PCT/US2011/062553, mailed on May 9, 2012.

(Continued)

*Primary Examiner* — Steven Wong
(74) *Attorney, Agent, or Firm* — Quinn Law Group, PLLC (57) ABSTRACT

A sport ball may incorporate a casing that includes a plurality of joined panels. At least one of the panels may have a first layer, a second layer, and a third layer. The casing defines at least one indentation in the exterior surface, and the first layer is bonded to the third layer adjacent to the indentation. In some configurations, the casing may also define at least one indentations in a surface of the third layer, which may correspond in location with the indentation in the exterior surface. Additionally, the sport ball may include an intermediate structure and a bladder located within the casing.

19 Claims, 11 Drawing Sheets

(56) References Cited

U.S. PATENT DOCUMENTS

| | | | |
|---|---|---|---|
| 2,018,559 A | 10/1935 | Everett | |
| 2,073,766 A | 3/1937 | Suzuki | |
| 2,080,894 A | 5/1937 | Levinson | |
| 2,126,220 A | 8/1938 | Scudder | |
| 2,245,115 A | 6/1941 | Reach | |
| 2,280,314 A | 4/1942 | Scudder | |
| 2,300,441 A | 11/1942 | Voit et al. | |
| 2,325,073 A | 7/1943 | Reach | |
| 2,344,638 A | 3/1944 | Reeder | |
| 2,843,383 A | 7/1958 | Wheeler | |
| 2,945,693 A | 7/1960 | Way | |
| 3,119,618 A * | 1/1964 | Molitor et al. | 473/599 |
| 3,512,777 A | 5/1970 | Henderson | |
| 4,154,789 A | 5/1979 | Delacoste | |
| 4,318,544 A * | 3/1982 | Brine, Jr. | 473/596 |
| 4,436,276 A | 3/1984 | Donahue | |
| 4,462,590 A | 7/1984 | Mitchell | |
| 4,610,071 A | 9/1986 | Miller | |
| D322,105 S | 12/1991 | Ma | |
| 5,123,659 A | 6/1992 | Williams | |
| 5,181,717 A | 1/1993 | Donntag et al. | |
| 5,250,070 A | 10/1993 | Parodi | |
| 5,494,625 A | 2/1996 | Hu | |
| 5,503,699 A | 4/1996 | Ratner et al. | |
| 5,603,497 A | 2/1997 | Louez | |
| 5,888,157 A | 3/1999 | Guenther et al. | |
| 6,012,997 A | 1/2000 | Mason | |
| 6,099,423 A * | 8/2000 | Ou | 473/604 |
| 6,142,897 A | 11/2000 | Lees | |
| 6,206,795 B1 * | 3/2001 | Ou | 473/599 |
| 6,261,400 B1 | 7/2001 | Kennedy, III | |
| 6,302,815 B1 | 10/2001 | Shishido et al. | |
| 6,406,389 B1 * | 6/2002 | Feeney et al. | 473/604 |
| 6,461,461 B2 | 10/2002 | Kennedy, III | |
| 6,506,135 B2 * | 1/2003 | Ou | 473/604 |
| 6,544,133 B2 | 4/2003 | Ou | |
| 6,629,902 B2 | 10/2003 | Murphy et al. | |
| 6,645,099 B2 | 11/2003 | Gaff et al. | |
| 6,656,067 B2 * | 12/2003 | Ou | 473/605 |
| 6,685,585 B2 | 2/2004 | Shishido et al. | |
| 6,726,582 B1 | 4/2004 | Kuo et al. | |
| 6,726,583 B1 * | 4/2004 | Lai | 473/605 |
| 6,971,965 B1 | 12/2005 | Shishido | |
| 6,991,569 B2 | 1/2006 | Dobrounig | |
| 7,005,025 B2 | 2/2006 | Summers | |
| 7,029,407 B2 | 4/2006 | Lee et al. | |
| 7,066,853 B2 | 6/2006 | Chang | |
| 7,749,116 B2 * | 7/2010 | Tang et al. | 473/604 |
| 8,047,937 B2 | 11/2011 | Krysiak | |
| 8,142,311 B2 | 3/2012 | Krysiak | |
| 8,382,619 B2 * | 2/2013 | Bulfin | 473/604 |
| 8,672,783 B2 * | 3/2014 | Fujikura et al. | 473/604 |
| 2002/0086749 A1 | 7/2002 | Ou | |
| 2003/0203780 A1 | 10/2003 | Guenther et al. | |
| 2004/0077288 A1 | 4/2004 | Krysiak et al. | |
| 2004/0087396 A1 * | 5/2004 | Chan | 473/605 |
| 2004/0144477 A1 | 7/2004 | Taniguchi et al. | |
| 2004/0229722 A1 | 11/2004 | Liu | |
| 2005/0081982 A1 | 4/2005 | Chen | |
| 2005/0229985 A1 | 10/2005 | Saxenfelt | |
| 2006/0063622 A1 | 3/2006 | Nurnberg et al. | |
| 2006/0229149 A1 | 10/2006 | Goedoen | |
| 2006/0293132 A1 | 12/2006 | Laliberty et al. | |
| 2007/0049434 A1 | 3/2007 | Maziarz et al. | |
| 2008/0032834 A1 * | 2/2008 | Krysiak | 473/597 |
| 2009/0325740 A1 * | 12/2009 | Krysiak | 473/596 |
| 2009/0325741 A1 * | 12/2009 | Krysiak | 473/596 |
| 2009/0325742 A1 * | 12/2009 | Krysiak | 473/596 |
| 2009/0325743 A1 * | 12/2009 | Krysiak | 473/597 |
| 2009/0325745 A1 | 12/2009 | Rapaport et al. | |
| 2009/0325746 A1 | 12/2009 | Raynak et al. | |
| 2010/0167850 A1 | 7/2010 | Lin | |
| 2010/0240479 A1 | 9/2010 | Raynak et al. | |
| 2012/0142465 A1 | 6/2012 | Berggren et al. | |
| 2012/0149508 A1 | 6/2012 | Krysiak | |
| 2012/0172160 A1 | 7/2012 | Marc | |
| 2012/0264552 A1 * | 10/2012 | Krysiak | 473/596 |
| 2012/0277044 A1 | 11/2012 | Berggren et al. | |

FOREIGN PATENT DOCUMENTS

| | | |
|---|---|---|
| EP | 0598542 | 5/1994 |
| EP | 1884265 | 2/2008 |
| FR | 2572674 | 5/1986 |
| JP | 10337341 | 12/1998 |
| WO | 0048690 | 8/2000 |
| WO | 2013/148946 A1 | 10/2013 |

OTHER PUBLICATIONS

International Preliminary Report on Patentability mailed Jun. 13, 2013 in connection with International Patent Application Serial No. PCT/US2011/062553; 6 pages.

Office Action dated Apr. 5, 2013 in U.S. Appl. No. 12/959,886.

Notice of Allowance dated Aug. 23, 2013 in U.S. Appl. No. 12/959,886.

Voluntary Amendments dated Jan. 13, 2014 in EP Application No. 11808021.7.

Voluntary Amendments dated Dec. 3, 2013 in CN Application No. 201180057846.3.

Office Action issued Dec. 29, 2014 in Chinese Patent Application No. 201180057846.3.

Response filed Jan. 26, 2015 in European Patent Application No. 11808021.7.

International Search Report and Written Opinion mailed Mar. 11, 2015 in PCT/US2014/072334.

* cited by examiner

SPORT BALL WITH INDENTED CASING

CROSS-REFERENCE TO RELATED APPLICATION

This application is a divisional of Berggren et al., U.S. Patent Application Publication No. 2012/0142465, published on Jun. 7, 2012, the entire disclosure of which is incorporated herein by reference.

BACKGROUND

A variety of inflatable sport balls, such as a soccer ball, conventionally exhibit a layered structure that includes a casing, an intermediate structure, and a bladder. The casing forms an exterior portion of the sport ball and is generally formed from a plurality of durable and wear-resistant panels joined together along abutting edge areas (e.g., with stitching or adhesives). Although panel configurations may vary significantly, the casing of a traditional soccer ball includes thirty-two panels, twelve of which have a pentagonal shape and twenty of which have a hexagonal shape.

The intermediate structure forms a middle portion of the sport ball and is positioned between the casing and the bladder. Among other purposes, the intermediate structure may provide a softened feel to the sport ball, impart energy return, and restrict expansion of the bladder. In some configurations, the intermediate structure or portions of the intermediate structure may be bonded, joined, or otherwise incorporated into the casing as a backing material. In other configurations, the intermediate structure or portions of the intermediate structure may be bonded, joined, or otherwise incorporated into the bladder.

The bladder, which has an inflatable configuration, is located within the intermediate structure to provide an interior portion of the sport ball. In order to facilitate inflation (i.e., with pressurized air), the bladder generally includes a valved opening that extends through each of the intermediate structure and casing, thereby being accessible from an exterior of the sport ball.

SUMMARY

A sport ball may incorporate a casing that includes a plurality of joined panels. At least one of the panels may have (a) a first layer including a polymer material and positioned to form a portion of an exterior surface of the ball, (b) a second layer including a polymer foam material and positioned inward and adjacent to the first layer, and (c) a third layer including a textile material and positioned inward and adjacent to the second layer. The casing defines at least one indentation in the exterior surface, and the first layer is bonded to the third layer adjacent to the indentation. In some configurations, the casing may also define at least one indentations in a surface of the third layer, which may correspond in location with the indentation in the exterior surface. Additionally, the sport ball may include an intermediate structure and a bladder located within the casing.

A method of manufacturing a sport ball may include providing a panel having (a) a first layer including a polymer material, (b) a second layer including a polymer foam material and positioned adjacent to the first layer, and (c) a third layer including a textile material and positioned adjacent to the second layer. An area of the panel is compressed and heated to (a) soften a portion of the polymer foam material of the second layer and (b) bond the first layer to the third layer. Additionally, edge areas of the panel are joined to edge areas of additional panels.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose various sport ball configurations and methods relating to manufacturing of the sport balls. Although the sport ball is discussed and depicted in relation to a soccer ball, concepts associated with the configurations and methods may be applied to various types of inflatable sport balls. In addition to soccer balls, therefore, concepts discussed herein may be incorporated into basketballs, footballs (for either American football or rugby), volleyballs, and water polo balls, for example. A variety of non-inflatable sport balls, such as baseballs and softballs, may also incorporate concepts discussed herein.

General Sport Ball Configuration

Figure 1:
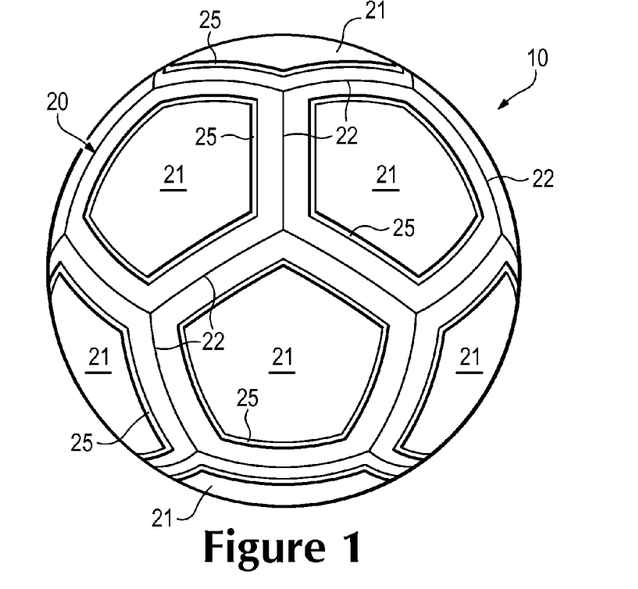
FIG. 1 is a perspective view of a sport ball.
Figure 2:
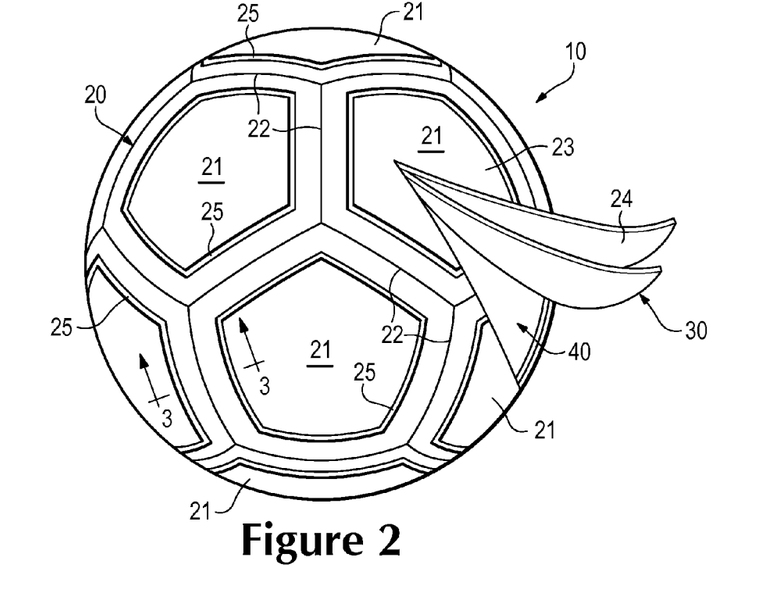
FIG. 2 is another perspective view of the sport ball.
Figure 3:
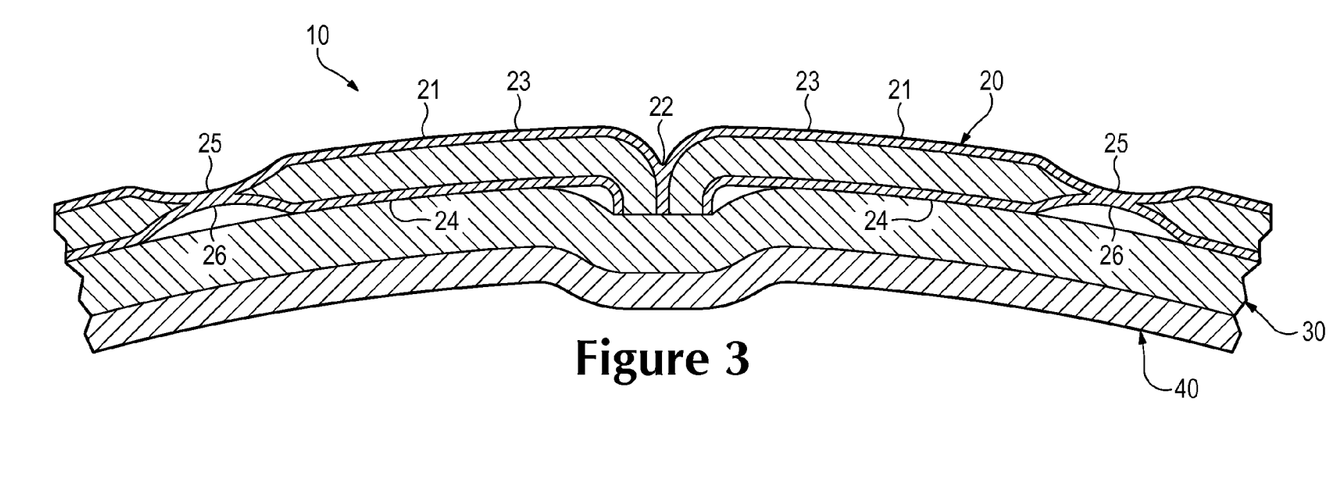
FIG. 3 is a cross-sectional view of the sport ball, as defined by section line 3 in FIG. 2.

A sport ball 10 having the general configuration of a soccer ball is depicted in FIGS. 1-3. Ball 10 exhibits a layered structure having (a) a casing 20 that forms an exterior portion of ball 10, (b) an intermediate structure 30 located within casing 20, and (c) an inflatable bladder 40 that forms an interior portion of ball 10. Upon pressurization, bladder 40 induces ball 10 to take on a substantially spherical shape. More particularly, pressure within bladder 40 causes bladder 40 to place an outward force upon intermediate structure 30. In turn, intermediate structure 30 places an outward force upon casing 20. In order to limit expansion of bladder 40 and also limit tension in casing 20, a portion of intermediate structure 30 may have a limited degree of stretch. In other words, bladder 40 places an outward force upon intermediate structure 30, but the stretch characteristics of intermediate structure 30 effectively prevent the outward force from inducing significant tension in casing 20. Accordingly, intermediate structure 30 restrains pressure from bladder 40, while permitting outward forces to induce a spherical shape in casing 20, thereby imparting a spherical shape to ball 10.

Casing 20 is formed from various panels 21 that are joined together along abutting side or edge areas to form a plurality of seams 22. Although panels 21 are depicted as having the shapes of twelve equilateral pentagons, panels 21 may have non-equilateral shapes, concave or convex edges, or a variety of other shapes (e.g., triangular, square, rectangular, hexagonal, trapezoidal, round, oval, non-geometrical) that combine in a tessellation-type manner to form casing 20. In some configurations, ball 10 may have twelve pentagonal panels 21 and twenty hexagonal panels 21 to impart the general configuration of a traditional soccer ball. Selected panels 21 may also be formed of unitary (i.e., one piece) construction with adjacent panels 21 to form bridged panels that reduce the number of seams 22. Although seams 22 may be formed by joining the abutting edge areas of panels 21 with stitching (e.g., hand or machine stitching), seams 22 may also be formed through adhesive bonding or welding. An example of welded seams is disclosed in U.S. Patent Application Publication 2010/0240479 to Raynak, et al., which is incorporated herein by reference.

Casing 20 defines an exterior surface 23 and an opposite interior surface 24. Exterior surface 23 faces outward and forms an exterior surface of ball 10. Interior surface 24 is located opposite exterior surface 23 and faces inward and toward intermediate structure 30. In many configurations of ball 10, interior surface 24 contacts intermediate structure 30. A plurality of indentations 25 and 26 are formed in casing 20 and extend toward a central area of casing 20, as depicted in FIGS. 1-3. Whereas indentations 25 are formed in exterior surface 23, indentations 26 are formed in interior surface 24. Indentations 25 are generally located opposite indentations 26. Indentations 25 and 26 impart various advantages to ball 10. For example, indentations 25 may have a design or appearance that enhances the aesthetics of ball 10. In some configurations, indentations 25 may also form indicia identifying the manufacturer of ball 10 or conveying information as to the features of ball 10. Additionally, indentations 25 may enhance the aerodynamics of ball 10 or provide an individual with greater control over ball 10 during kicking, dribbling, or passing, for example.

Intermediate structure 30 is positioned between casing 20 and bladder 40 and may be formed to include one or more of a compressible foam layer that provides a softened feel to the sport ball, a rubber layer that imparts energy return, and a restriction layer to restrict expansion of bladder 40. The overall structure of intermediate structure 30 may vary significantly. As an example, the restriction layer may be formed from (a) a thread, yarn, or filament that is repeatedly wound around bladder 40 in various directions to form a mesh that covers substantially all of bladder 40, (b) a plurality of generally flat or planar textile elements stitched together to form a structure that extends around bladder 40, or (c) a plurality of generally flat or planar textile strips that are impregnated with latex and placed in an overlapping configuration around bladder 40. As another example, intermediate structure 30 may be formed as a substantially seamless and curved (e.g., hemispherical or spherical) textile, as disclosed in U.S. Patent Application Publication 2009/0325746 to Raynak, et al., which is incorporated herein by reference. In some configurations of ball 10, intermediate structure 30 or portions of intermediate structure 30 may also be bonded, joined, or otherwise incorporated into bladder 40, or intermediate structure 30 may be absent from ball 10. Accordingly, the structure of intermediate structure 30 may vary significantly to include a variety of configurations and materials.

Bladder 40 has an inflatable configuration and is located within intermediate structure 30 to provide an inner portion of ball 10. When inflated, bladder 40 exhibits a rounded or generally spherical shape. In order to facilitate inflation, bladder 40 may include a valved opening (not depicted) that extends through intermediate structure 30 and casing 20, thereby being accessible from an exterior of ball 10, or bladder 40 may have a valveless structure that is semi-permanently inflated. Bladder 40 may be formed from a rubber or carbon latex material that substantially prevents air or other fluids within bladder 40 from diffusing to the exterior of ball 10. In addition to rubber and carbon latex, a variety of other elastomeric or otherwise stretchable materials may be utilized for bladder 40. Bladder 40 may also have a structure formed from a plurality of joined panels, as disclosed in U.S. Patent Application Publication 2009/0325745 to Rapaport, et al., which is incorporated herein by reference.

Panel Configuration

Figure 4:
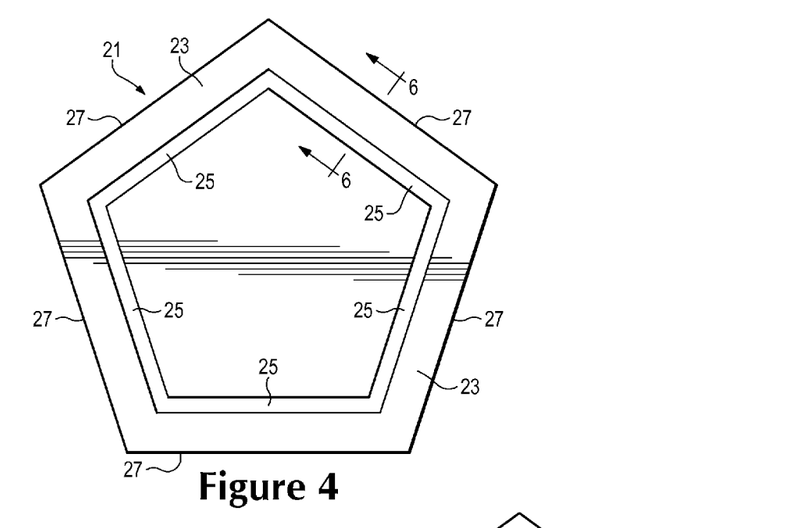
FIG. 4 is a top plan view of a panel of the sport ball.
Figure 5:
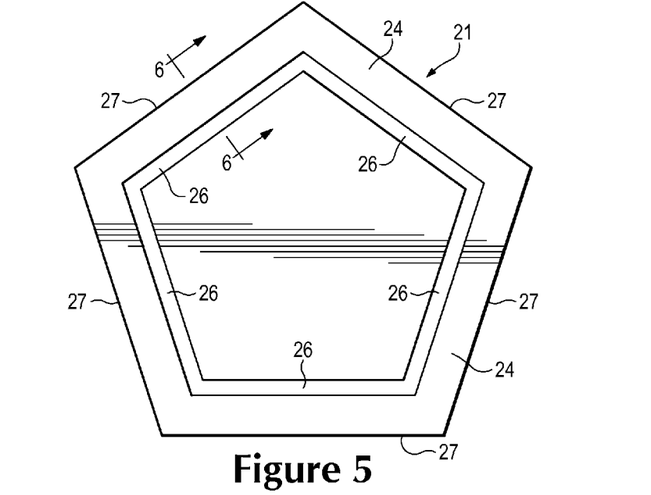
FIG. 5 is a bottom plan view of the panel.
Figure 6:
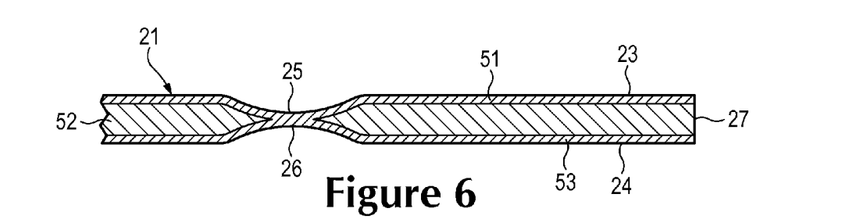
FIG. 6 is a cross-sectional view of the panel, as defined by section line 6 in FIGS. 4 and 5.

An individual panel 21 is depicted in FIGS. 4-6 and has a layered structure that includes a first or outer layer 51, a second or middle layer 52, and a third or inner layer 53. Outer layer 51 forms a portion of exterior surface 23, middle layer 52 is positioned inward and adjacent to outer layer 51, and inner layer 53 is positioned inward and adjacent to middle layer 52. In this configuration, middle layer 52 is positioned between layers 51 and 53. That is, layers 51 and 53 effectively form cover layers (i.e., outer and inner layers) located on opposite sides of middle layer 52.

A variety of materials may be utilized for each of layers 51-53, including various polymer materials, polymer foam materials, and textiles. More particularly, outer layer 51 may be formed from polymer materials that impart a durable and wear-resistant exterior surface for ball 10. Examples of suitable polymer materials for panels 21 include polyurethane, polyvinylchloride, polyamide, polyester, polypropylene, and polyolefin. In some configurations, outer layer 51 may be formed from a synthetic leather material. Middle layer 52 may be formed from a polymer foam material, such as polyurethane or ethylvinylacetate. In some configurations, middle layer 52 may include layers (e.g., three layers) of polymer foam material having different densities. Additionally, inner layer 53 may be formed from a textile material (e.g., a woven or knit textile). More particularly, the textile material of inner layer 53 may formed from polyester, cotton, nylon, rayon, silk, spandex, or a variety of other materials. The textile material may also include multiple materials, such as a polyester and cotton blend. In some configurations, one or more layers 51-53 may incorporate filaments or fibers that reinforce or strengthen casing 20.

Layers 51 and 53 are generally spaced from each other by middle layer 52. In the areas of indentations 25 and 26, however, layers 51 and 53 bow inward and are bonded or otherwise secured to each other. That is, indentations 25 and 26 are located opposite each other and extend into panel 21 at corresponding locations, where the portions of layers 51 and 53 that respectively form indentations 25 and 25 are secured to each other. Whereas a majority of outer layer 51 is spaced from inner layer 53, layers 51 and 53 extend through middle layer 52 in the areas of indentations 25 and 26 to bond or otherwise be secured to each other. As such, middle layer 52 may part, form an aperture, or otherwise be absent in the areas of indentations 25 and 26. In some configurations, middle layer 52 may compress significantly in the areas of indentations 25 and 26, thereby forming a polymer layer that separates the portions of layers 51 and 53 that form indentations 25 and 26.

Figure 7A:
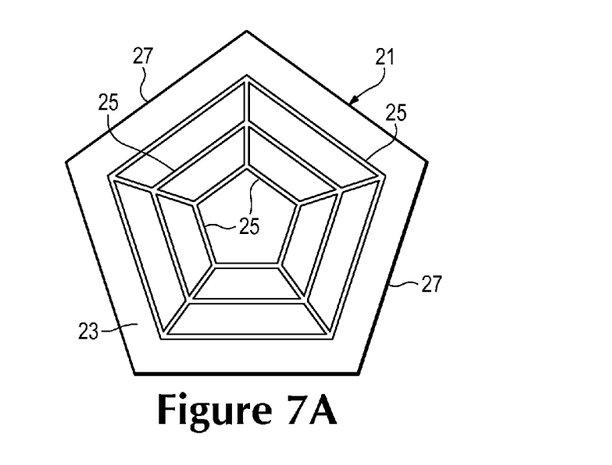
FIGS. 7A-7F are top plan views corresponding with FIG. 4 and depicting further configurations of the panel.
Figure 7B:
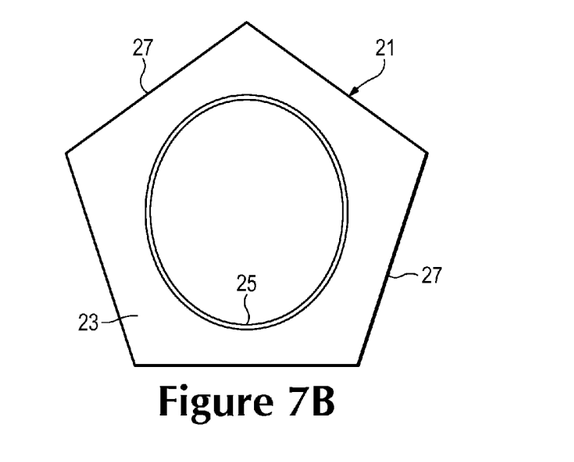
Figure 7C:
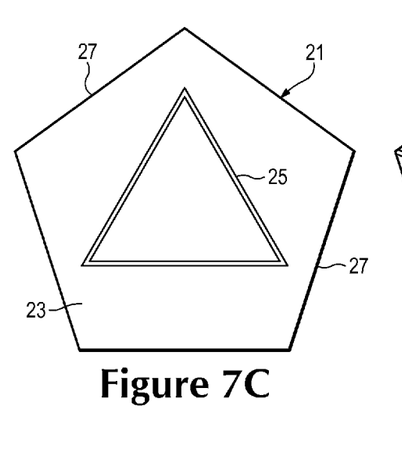
Figure 7D:
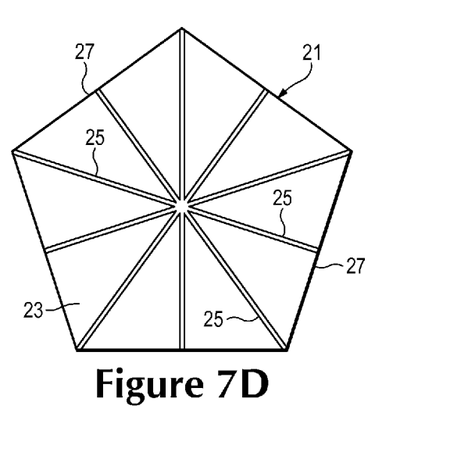
Figure 7E:
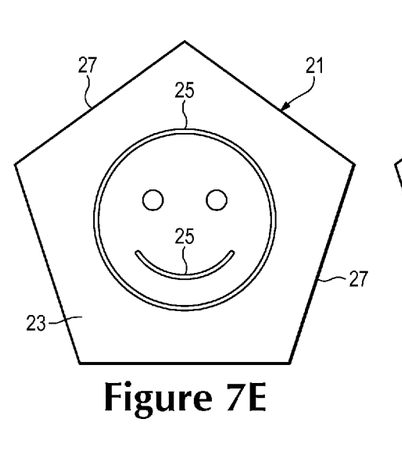
Figure 7F:
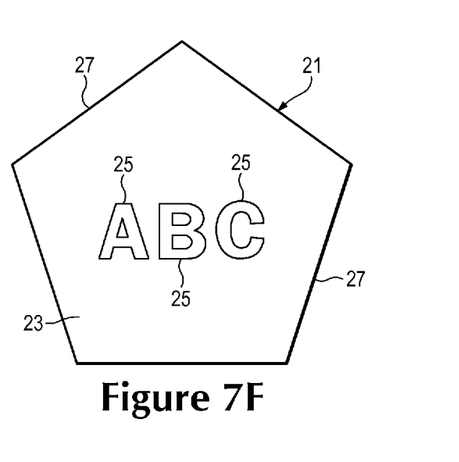

The positions of indentations 25 and 26 relative to panel 21 may vary considerably. As depicted, indentations 25 and 26 extend parallel to a plurality of edges 27 of panel 21. In this configuration, indentations 25 and 26 form a pentagonal shape that is spaced inward from edges 27. In further configurations of panel 21, however, indentations 25 and 26 may be located in other areas or may impart different shapes or arrangements. For example, FIG. 7A depicts a configuration wherein indentations 25 form concentric pentagons that are connected by radial portions. In FIGS. 7B and 7C, indentations 25 respectively have circular and triangular configurations, but may also be square, rectangular, hexagonal, or any other regular or non-regular shape. Referring to FIG. 7D, indentations 25 exhibit a radial configuration. In some configurations, indentations 25 may have a graphic appearance, as in FIG. 7E, or may impart information, as in FIG. 7F. Moreover, indentations 25 may also form the shape of a company logo or trademark. As discussed above, indentations 25 may have a design or appearance that enhances the aesthetics of ball 10, form indicia identifying the manufacturer of ball 10, convey information as to the features of ball 10, enhance the aerodynamics of ball 10, or provide an individual with greater control over ball 10. These advantages may be incorporated into ball 10 by varying the shapes and arrangements of indentations 25 and 26.

Figure 8A:
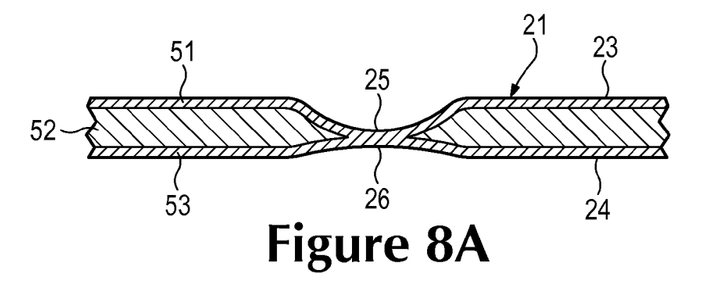
FIGS. 8A-8D are cross-sectional views corresponding with FIG. 6 and depicting further configurations of the panel.
Figure 8B:
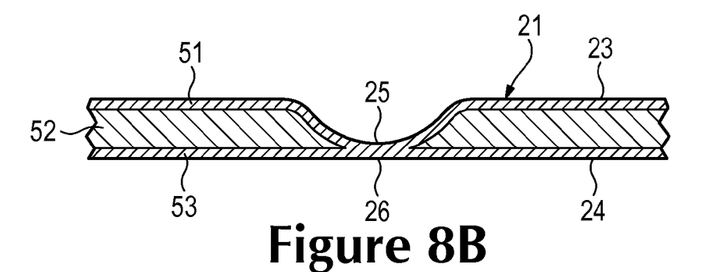
Figure 8C:
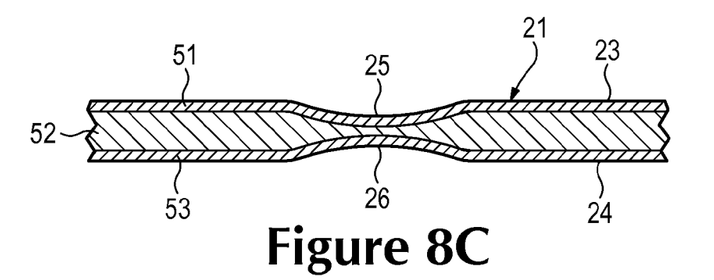
Figure 8D:
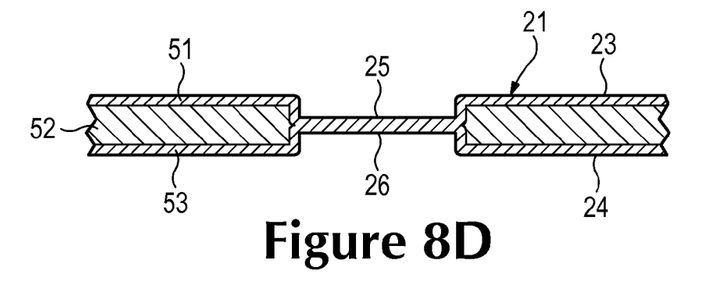

The specific configuration of indentations 25 and 26 may also vary considerably. Referring to FIG. 6, indentations 25 and 26 each have a generally rounded configuration that extends to an approximate midpoint of panel 21. In another configuration, as depicted in FIG. 8A, indentations 25 may extend through more of the thickness of panel 21 than indentations 26. Referring to FIG. 8B, indentations 25 extend through substantially all of the thickness of panel 21. Referring to FIG. 8C, indentations 25 and 26 may be spaced from each other such that a portion of middle layer 52 extends between indentations 25 and 26. In this configuration, middle layer 52 has (a) a first thickness between indentations 25 and 26 and (b) a second thickness in an area spaced from indentations 25 and 26, the first thickness being less than the second thickness. As opposed to rounded, indentations 25 and 26 may also exhibit squared configurations, as depicted in FIG. 8D. Accordingly, indentations 25 and 26 may have various configurations.

Based upon the above discussion, panels 21 incorporate indentations 25 and 26, which may have a design or appearance that enhances the aesthetics of ball 10. In some configurations, indentations 25 may also form indicia identifying the manufacturer of ball 10 or conveying information as to the features of ball 10. Additionally, indentations 25 may enhance the aerodynamics of ball 10 or provide an individual with greater control over ball 10 during kicking, dribbling, or passing, for example.

Manufacturing Process

Figure 9A:
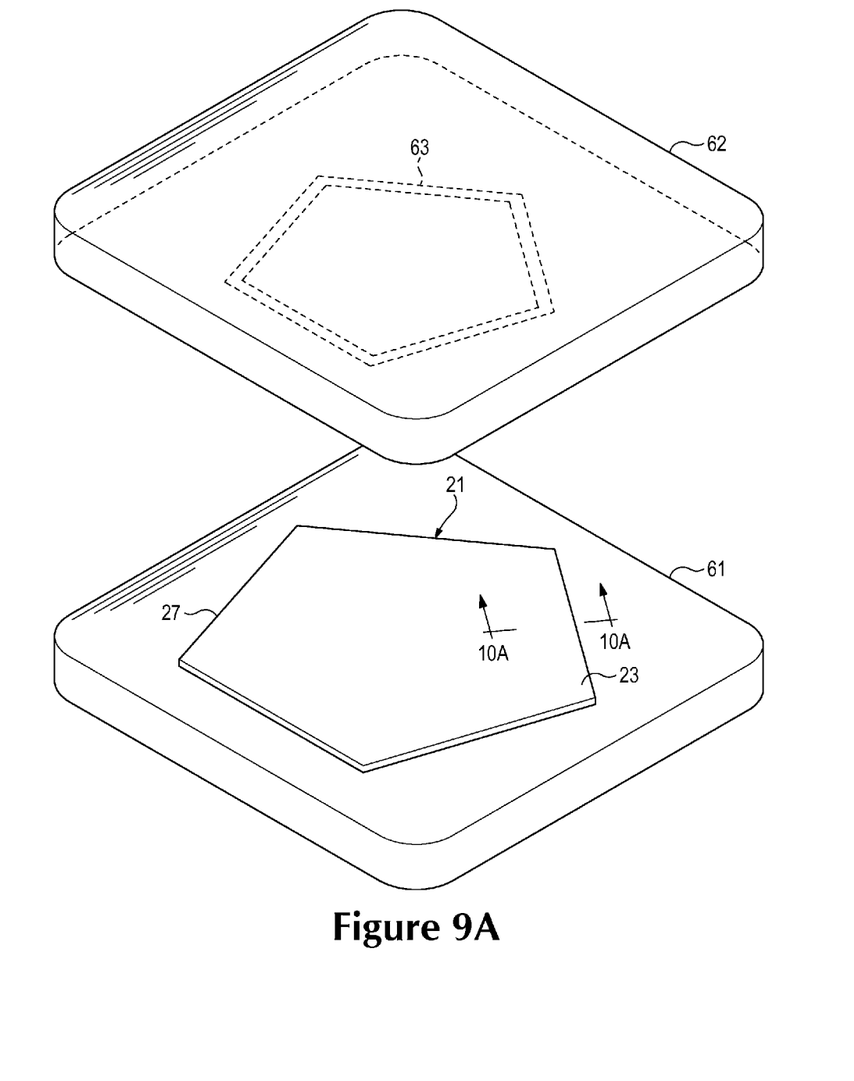
FIGS. 9A-9C are schematic perspective views of a process for forming the panel.
Figure 9B:
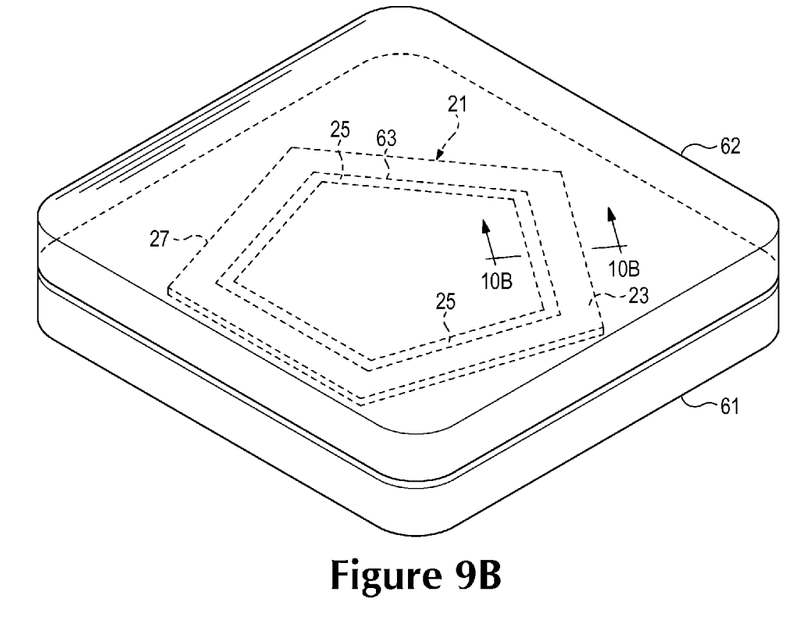
Figure 9C:
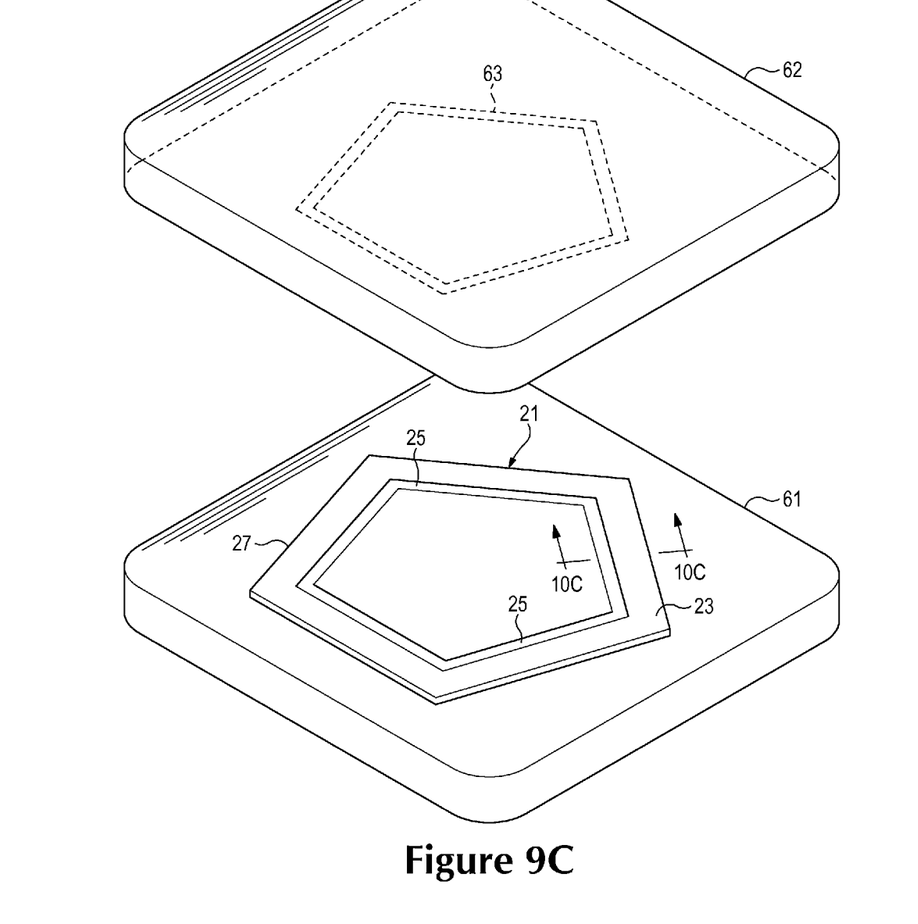
Figure 10A:
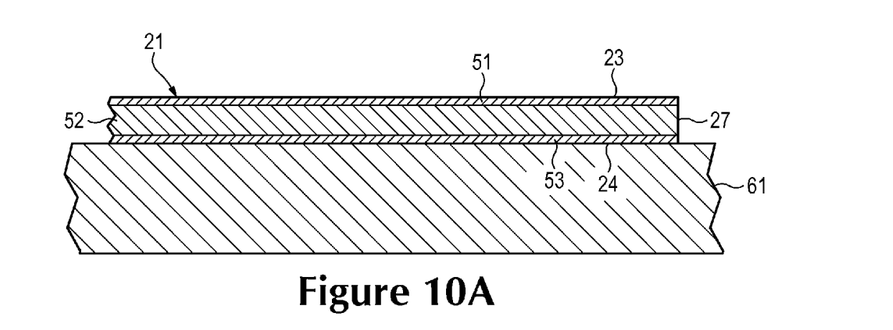
FIGS. 10A-10C are cross-sectional views of the process for forming the panel, as respectively defined by section lines 10A-100 in FIGS. 9A-9C.
Figure 10B:
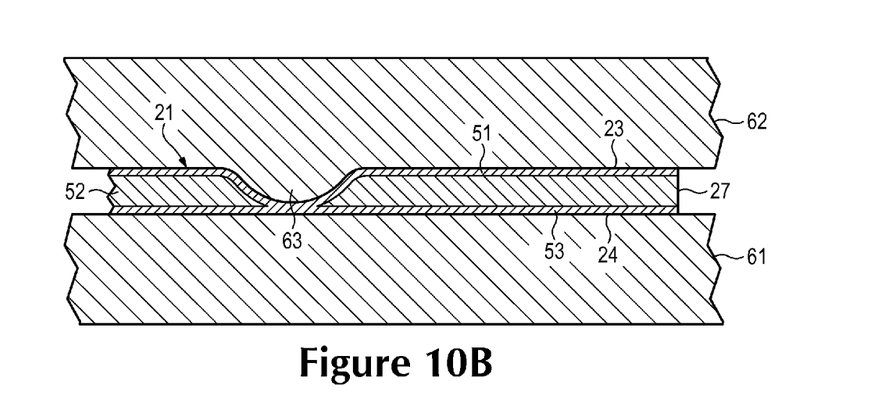
Figure 10C:
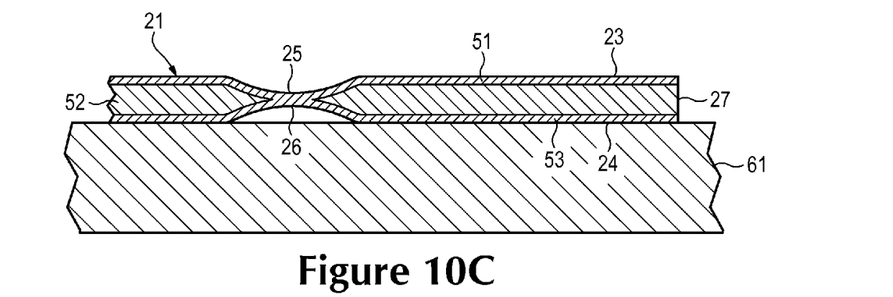

A variety of manufacturing processes may be utilized to form indentations 25 and 26 in panels 21. An example of a manufacturing process is depicted in FIGS. 9A-9C and 10A-10C. Referring to FIGS. 9A and 10A, one of panels 21 is located on a platen 61. A press plate 62 is positioned above platen 61 and includes a protrusion 63 having a pentagonal shape (e.g., a shape of indentations 25 and 26). Press plate 62 then translates toward platen 61 and compresses panel 21, as depicted in FIGS. 9B and 10B. More particularly, protrusion 63 presses into and heats the areas of panel 21 forming indentations 25 and 26. As such, press plate 62 and protrusion 63 (a) soften a portion of middle layer 52, which may be formed form a polymer foam material and (b) bond outer layer 51 to inner layer 53. As depicted in FIGS. 9C and 100, press plate 62 then moves away from panel 21 to substantially complete the formation of indentations 25 and 26.

When exposed to sufficient heat, the polymer materials within panels 21 transition from a solid state to either a softened state or a liquid state, particularly when a thermoplastic polymer material is utilized. When sufficiently cooled, the polymer materials then transition back from the softened state or the liquid state to the solid state. Based upon these properties, (a) the polymer material of outer layer 51 may soften to form a bond with the textile material of inner layer 53 and (b) the polymer foam material of middle layer 52 may melt, soften, part, collapse, or form an aperture that permits layers 51 and 53 to contact and bond with each other.

In order to properly heat the materials within panel 21, bonding apparatus 62 may emit heat when in contact with panel 21. In some configurations, resistive heating elements may be incorporated into press plate 62 to raise the temperature of panel 21 in the areas of indentations 25 and 26. Alternately, high-frequency (HF) heating, radio frequency (RF) heating, or ultrasonic heating elements may be incorporated into press plate 62 and protrusion 63 to raise the temperature of panel 21 in the areas of indentations 25 and 26.

As an additional matter, the process disclosed above depicts protrusion 63 as pressing into one side of panel 21. That is, protrusion 63 presses into the side of panel 21 that includes outer layer 51. Although press plate 62 compresses outer layer 51 against inner layer 53, which lays against platen 61, indentation 26 forms in inner layer 53. More particularly, outer layer 51 is effectively placed in tension by the pressure from press plate 62. When the pressure from press plate 62 is removed, the tension in outer layer 51 pulls inner layer 53 toward the center of panel 21. Although protrusion 63 only presses into one side of panel 21, both indentations 25 and 26 are formed due to an equalization of forces in panel 21. Accordingly, both of indentations 25 and 26 may be formed by pressing into only one side of panel 21 with press plate 62.

Further Sport Ball Configuration

Figure 11:
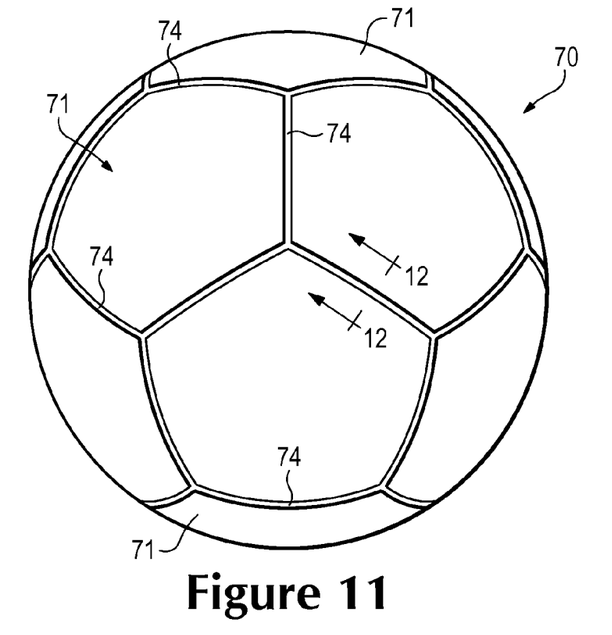
FIG. 11 is a perspective view of another sport ball.
Figure 12:
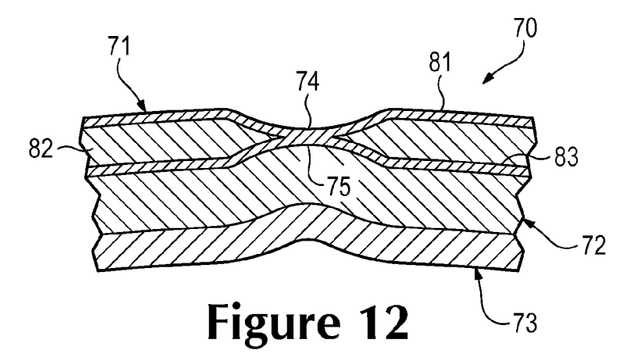
FIG. 12 is a cross-sectional view, as defined by section line 12 in FIG. 11.

Another sport ball 70 is depicted in FIGS. 11 and 12 as including a casing 71, an intermediate structure 72, and a bladder 73. As with panels 21 of casing 20, casing 71 has a layered configuration that includes an outer layer 81, a middle layer 82, and an inner layer 83. Additionally, layers 81 and 83 respectively form indentations 74 and 75 in areas of casing 71. Whereas casing 20 included various panels 21 that were joined by seams 22, casing 71 has a substantially uniform or unbroken configuration that does not include panels or includes fewer panels. In order to impart the appearance of seams similar to seams 22, however, indentations 74 and 75 are located in areas that correspond with the positions of seams 22 in ball 10. That is, indentations 74 and 75 impart the appearance of seams in ball 70.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A sport ball comprising:
a casing having an exterior surface facing outward from the sport ball and an opposite interior surface facing inward, the casing including a plurality of panels, the plurality of panels including a first panel having (a) an outer layer that defines a first indentation in the exterior surface of the casing, (b) an inner layer that defines a second indentation in the interior surface of the casing, and (c) a central layer, a majority of the outer layer of the first panel being spaced from the inner layer of the first panel by the central layer, and the outer layer of the first panel being secured to the inner layer of the first panel at the first indentation and the second indentation; and a bladder located within the casing;

wherein the first panel has one or more peripheral edges joined to edges of adjacent panels of the casing to form one or more seams, each of the one or more seams projecting inward beyond portions of the first panel adjacent the one or more seams, the first indentation extending to at least one of the one or more peripheral edges;

wherein a first portion of the first indentation is spaced from at least one of the one or more peripheral edges of the first panel;

wherein a second portion of the first indentation extends to at least one of the one or more peripheral edges of the first panel; and wherein the first indentation and the second indentation each have a substantially squared cross-sectional configuration.

2. The sport ball recited in claim 1, wherein the casing defines a second indentation in a surface of the third layer, the first layer being bonded to the third layer adjacent to the second indentation.

3. The sport ball recited in claim 1, wherein at least the first layer extends through the second layer in an area where the first layer is bonded to the third layer.

4. The sport ball recited in claim 1, wherein the second layer has (a) a first thickness adjacent to the area where the first layer is bonded to the third layer and (b) a second thickness spaced from the area where the first layer is bonded to the third layer, the first thickness being less than the second thickness.

5. The sport ball recited in claim 1, wherein the outer layer includes a polymer material and the central layer includes a polymer foam material including a thermoplastic polymer material.

6. The sport ball recited in claim 1, wherein an intermediate structure is located between the casing and the bladder.

7. A sport ball comprising:

a casing having an exterior surface facing outward from the sport ball and an opposite interior surface facing inward, the casing including a plurality of panels, the plurality of panels including a first panel having (a) an outer layer that defines a first indentation in the exterior surface of the casing, (b) an inner layer that defines a second indentation in the interior surface of the casing, and (c) a central layer, a majority of the outer layer of the first panel being spaced from the inner layer of the first panel by the central layer, and the outer layer of the first panel being secured to the inner layer of the first panel at the first indentation and the second indentation; and a bladder located within the casing;

wherein the first panel has one or more peripheral edges joined to edges of adjacent panels of the casing to form one or more seams, each of the one or more seams projecting inward beyond portions of the first panel adjacent the one or more seams, the first indentation and the second indentation each extending to at least one of the one or more peripheral edges; and wherein the first indentation and the second indentation each have a substantially squared cross-sectional configuration.

8. The sport ball recited in claim 7, wherein the outer layer is formed from a polymer material and the inner layer is formed from a textile material.

9. The sport ball recited in claim 7, wherein the outer layer and the inner layer extend into the central layer between the first indentation and the second indentation.

10. The sport ball recited in claim 7, wherein the central layer has (a) a first thickness between the first indentation and the second indentation and (b) a second thickness in an area spaced from the first indentation and the second indentation, the first thickness being less than the second thickness.

11. The sport ball recited in claim 7, wherein an intermediate structure is located between the casing and the bladder.

12. A sport ball comprising:

a casing having an exterior surface facing outward from the sport ball and an opposite interior surface facing inward, the casing including a plurality of panels, the plurality of panels including a first panel having (a) an outer layer that defines a first indentation in the exterior surface of the casing, (b) an inner layer that defines a second indentation in the interior surface of the casing, and (c) a central layer, a majority of the outer layer of the first panel being spaced from the inner layer of the first panel by the central layer, and the outer layer of the first panel being secured to the inner layer of the first panel at the first indentation and the second indentation; and a bladder located within the casing;

wherein the first panel has one or more peripheral edges joined to edges of adjacent panels of the casing to form one or more seams, each of the one or more seams projecting inward beyond portions of the first panel adjacent the one or more seams, the first indentation extending to at least one of the one or more peripheral edges;

wherein the first indentation and the second indentation each have a substantially squared cross-sectional configuration.

13. The sport ball recited in claim 12, wherein the outer layer is formed from a polymer material and the inner layer is a textile material.

14. The sport ball recited in claim 12, wherein the central layer is a polymer foam layer.

15. The sport ball recited in claim 12, wherein an intermediate structure is located between the casing and the bladder.

16. The sport ball of claim 12, wherein the first indentation and the second indentation are opposing indentations; and wherein a majority of the central layer is formed from a polymer foam material with a first thickness, and a portion of the central layer located between the indentations has a second thickness, the first thickness being greater than the second thickness.

17. The sport ball recited in claim 12, wherein the first indentation is disposed opposite the second indentation.

18. The sport ball recited in claim 12, wherein a majority of the outer layer is spaced from the inner layer.

19. The sport ball recited in claim 12, wherein the first indentation extends through more of a thickness of the first panel than the second indentation.

* * * * *